United States Patent
Berryann et al.

(10) Patent No.: US 8,308,423 B2
(45) Date of Patent: Nov. 13, 2012

(54) VARIABLE AREA FAN NOZZLE FOR ACCOMMODATING A FOREIGN OBJECT STRIKE EVENT

(75) Inventors: Andrew P. Berryann, Manchester, CT (US); Stephen A. Morford, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 632 days.

(21) Appl. No.: 12/442,569

(22) PCT Filed: Oct. 12, 2006

(86) PCT No.: PCT/US2006/040066
§ 371 (c)(1),
(2), (4) Date: Mar. 24, 2009

(87) PCT Pub. No.: WO2008/045080
PCT Pub. Date: Apr. 17, 2008

(65) Prior Publication Data
US 2010/0003121 A1    Jan. 7, 2010

(51) Int. Cl.
*F01D 19/00* (2006.01)
(52) U.S. Cl. ............................ 415/13; 415/17
(58) Field of Classification Search ................ 415/1, 13, 415/17
See application file for complete search history.

(56) References Cited

U.S. PATENT DOCUMENTS

| | | | |
|---|---|---|---|
| 3,744,938 A * | 7/1973 | Matvey | 418/18 |
| 5,072,580 A * | 12/1991 | Patterson et al. | 60/242 |
| 5,261,227 A | 11/1993 | Giffin, III | |
| 5,691,921 A * | 11/1997 | Berlin | 702/99 |
| 6,868,664 B2 * | 3/2005 | Albero et al. | 60/224 |

FOREIGN PATENT DOCUMENTS

| | | |
|---|---|---|
| EP | 0005135 | 4/1979 |
| EP | 0284392 | 3/1988 |
| EP | 0844377 | 5/1996 |

OTHER PUBLICATIONS

International Preliminary Report on Patentability dated Feb. 27, 2009.
Search Report and Written Opinion mailed on Jul. 9, 2007 for PCT/US2006/040066.

* cited by examiner

*Primary Examiner* — Julio J Maldonado
*Assistant Examiner* — Robert Bachner
(74) *Attorney, Agent, or Firm* — Carlson, Gaskey & Olds PC

(57) ABSTRACT

A gas turbine engine system includes a fan and a fan bypass passage downstream of the fan for conveying a bypass airflow from the fan. A nozzle associated with the fan bypass passage includes a plurality of different positions that influence the bypass air flow. One or more sensors near the fan produce a signal representative of a foreign object near the fan. A controller commands the nozzle to move to a desired one of the plurality of different positions in response to the signal from the sensor to change a pressure ratio across the fan to thereby reduce a mechanical stress on the fan.

24 Claims, 2 Drawing Sheets

VARIABLE AREA FAN NOZZLE FOR ACCOMMODATING A FOREIGN OBJECT STRIKE EVENT

BACKGROUND OF THE INVENTION

This invention relates to gas turbine engines and, more particularly, to a gas turbine engine having a variable fan nozzle for accommodating a foreign object strike event.

Gas turbine engines are widely known and used for power generation and vehicle (e.g., aircraft) propulsion. A typical gas turbine engine includes a fan section, a compression section, a combustion section, and a turbine section that utilize a primary airflow into the engine to generate power or propel the vehicle. The gas turbine engine is typically mounted within a housing, such as a nacelle. A bypass airflow flows through a passage between the housing and the engine and exits from the engine at an outlet.

Current regulations require that gas turbine engines meet a certain performance level following ingestion of a foreign object, such as a bird. Presently, engines are designed robustly to withstand such events and thereby meet a desired level. For example, the nacelle and fan of the fan section are made thicker or otherwise reinforced to withstand elevated stresses caused by the ingestion of the foreign object. Undesirably, this adds weight to the engine, which ultimately increases fuel consumption. Therefore, what is needed is an engine having enhanced controls for reducing the stresses caused from foreign object ingestion to thereby permit the nacelle and fan section to be less robust for improved fuel consumption. This invention addresses this need.

SUMMARY OF THE INVENTION

An example gas turbine engine system includes a fan and a fan bypass passage downstream of the fan for conveying a bypass airflow. A nozzle associated with the fan bypass passage includes a plurality of different positions that influence the bypass airflow. In one example, one or more sensors near the fan produce a signal representative of a foreign object near the fan. A controller commands the nozzle to move to a desired one of the plurality of different positions in response to the signal from the sensor to change a pressure ratio across the fan to thereby reduce a mechanical stress on the fan.

An example method of controlling the gas turbine engine system includes the steps of using a sensor or other device to identify the presence of the foreign object and moving the nozzle to a desired one of the plurality of different positions to change the pressure ratio.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
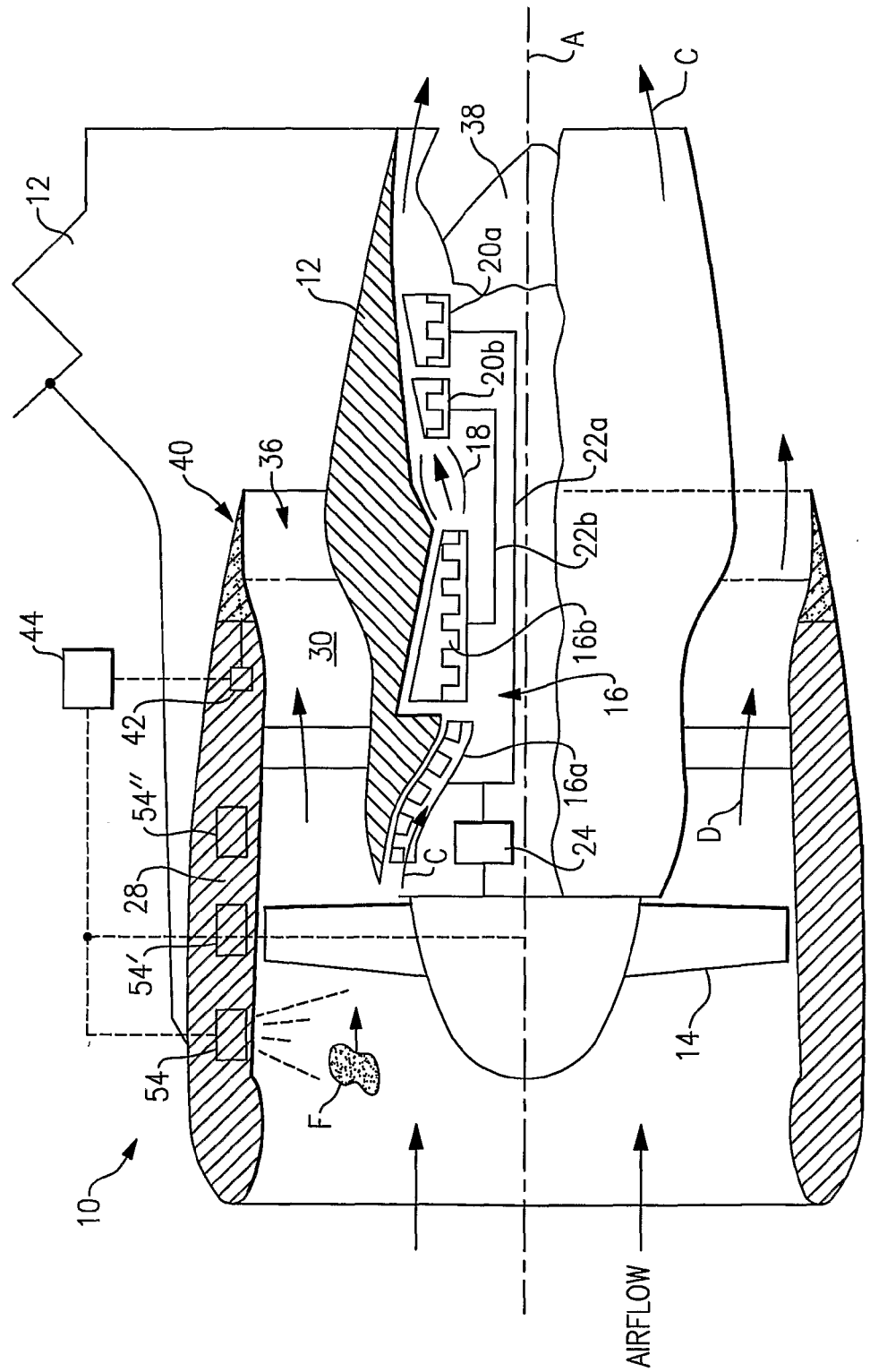
FIG. 1 is a schematic view of an example gas turbine engine having a nozzle for influencing a bypass airflow in response to ingestion of a foreign object.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a low pressure turbine 20a, and a high pressure turbine 20b. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22a and 22b (e.g., spools) to rotationally drive the compressors 16a, 16b and the fan 14 in response to the expansion. In this example, the rotor 22a also drives the fan 14 through a gear train 24.

In the example shown, the gas turbine engine 10 is a high bypass turbofan arrangement. In one example, the bypass ratio is greater than 10, and the fan 14 diameter is substantially larger than the diameter of the low pressure compressor 16a. The low pressure turbine 20a has a pressure ratio that is greater than 5, in one example. The gear train 24 can be any known suitable gear system, such as a planetary gear system with orbiting planet gears, planetary system with non-orbiting planet gears, or other type of gear system. In the disclosed example, the gear train 24 has a constant gear ratio. Given this description, one of ordinary skill in the art will recognize that the above parameters are only exemplary and that other parameters may be used to meet the particular needs of an implementation.

An outer housing, nacelle 28, (also commonly referred to as a fan nacelle) extends circumferentially about the fan 14. A generally annular fan bypass passage 30 extends between the nacelle 28 and an inner housing, inner cowl 34, which generally surrounds the compressors 16a, 16b and turbines 20a, 20b.

In operation, the fan 14 draws air into the gas turbine engine 10 as a core flow, C, and into the bypass passage 30 as a bypass air flow, D. In one example, approximately 80 percent of the airflow entering the nacelle 28 becomes bypass airflow D. A rear exhaust 36 discharges the bypass air flow D from the gas turbine engine 10. The core flow C is discharged from a passage between the inner cowl 34 and a tail cone 38. A significant amount of thrust may be provided by the discharge flow due to the high bypass ratio.

The example gas turbine engine 10 shown FIG. 1 also includes a nozzle 40 (shown schematically) associated with the bypass passage 30. In this example, the nozzle 40 is shown near the rear of the nacelle 28, however, in other examples, the nozzle is located farther forward but aft of the fan 14. In this example, the nozzle 40 is coupled to the nacelle 28. Alternatively, the nozzle 40 is coupled with the inner cowl 34, or other suitable structural portion of the gas turbine engine 10.

The nozzle 40 is operatively connected with actuators 42 for movement between a plurality of positions to influence the bypass air flow D, such as to manipulate an air pressure of the bypass air flow D. A controller 44 commands the actuators 42 to selectively move the nozzle 40 among the plurality of positions to manipulate the bypass air flow D in a desired manner. The controller 44 may be dedicated to controlling the actuators 42 and nozzle 40, integrated into an existing engine controller within the gas turbine engine 10, or be incorporated with other known aircraft or engine controls. For example, selective movement of the nozzle 40 permits the controller 44 to vary the amount and direction of thrust provided, enhance conditions for aircraft control, enhance conditions for operation of the fan 14, or enhance conditions for operation of other components associated with the bypass passage 30, depending on input parameters into the controller 44.

In one example, the gas turbine engine 10 is designed to operate within a desired performance envelope under certain predetermined conditions, such as cruise. For example, the fan 14 is designed for a particular flight condition—typically cruise at 0.8M and 35,000 feet. The fan 14 is designed at a particular fixed stagger angle for an efficient cruise condition. The nozzle 40 is operated to influence the bypass airflow D such that the angle of attack or incidence on the fan 14 is maintained close to design incidence at other flight conditions, such as landing and takeoff, thus enabling a desired engine operation over a range of flight condition with respect to performance and other operational parameters such as noise levels. In one example, it is desirable to operate the fan 14 under a desired pressure ratio range (i.e., the ratio of air pressure forward of the fan 14 to air pressure aft of the fan 14) to avoid fan flutter. To maintain this range, the nozzle 40 is used to influence the bypass airflow D to control the air pressure aft of the fan 14 and thereby control the pressure ratio. In some examples, the nozzle varies a cross-sectional area associated with the rear exhaust 36 of the bypass passage 30 by approximately 20% to influence the bypass airflow D.

In the illustrated example, a sensor 54 is mounted near the nacelle 28, forward of the fan 14 (relative to the direction of bypass air flow D through the engine 10). Alternatively, or in addition to sensor 54, a sensor 54' is located in axial alignment with the fan 14, or a sensor 54" is located aft of the fan 14. The sensor 54, 54', 54" detects the presence of a foreign object F, such as a bird or other debris, and produces a signal representing the presence of the foreign object F. That is, the sensor 54, 54', 54" detects incoming foreign objects and transmits the signal to the controller 44.

In one example, the sensor 54, 54', 54" is a known type of sensor that utilizes electro-optical techniques to identify the presence of the foreign object F. In another example, the sensor 54, 54', 54" is laser sensor (e.g., a non-intrusive stress measurement sensor) that identifies the presence of the foreign object based upon a characteristic of blades of the fan 14, such as a distance between the blades or a change in vibration of the blades. Given this description, one of ordinary skill in the art will be able to recognize other types of sensors to meet their particular needs.

The controller 44 commands the actuators 42 to move the nozzle 40 to a desired one of the plurality of positions in response to the presence of the foreign object F. In one example, the foreign object is a bird that is ingested into the engine 10 during flight of an aircraft, such as during take-off. In response to the bird ingestion, the controller 44 moves the nozzle 40 to a desired position. In one example, the desired position reduces an air pressure of the bypass airflow D within the bypass passage 30. This in turn reduces an air pressure ratio across the fan 14 (i.e., ratio of air pressure forward of the fan to the air pressure aft of the fan).

In another example, the controller 44 commands the actuators 42 to move the nozzle 40 to a desired one of the plurality of positions in response to manual feedback from a pilot of an aircraft. For example, the pilot may have seen a foreign object (e.g., a bird) be ingested into the gas turbine engine 10 or perceive an engine sound (e.g., fan pitch) that indicates a foreign object has been ingested and activate the controller 44 in response thereto to move the nozzle 40, as described above.

In this example, the air pressure ratio corresponds to a fan operation condition. In one example, the fan operation condition is the amount of mechanical stress on the fan 14 due to the air pressure ratio across the fan 14. Relatively lower pressure ratios correspond to relatively lower mechanical stresses, and relatively higher pressure ratios correspond to relatively higher mechanical stresses. Therefore, controlling the position of the nozzle 40 permits the controller 44 to reduce the mechanical stress on the fan 14 in response to a bird strike.

In one example, the reduction in mechanical stress on the fan 14 enhances the durability of the fan 14. For example, a bird strike often causes a phenomenon known as flutter (i.e., air pressure pulsation across the fan 14) that increases the mechanical stress on the fan 14. Adjusting the nozzle 40 to reduce the pressure ratio reduces or eliminates flutter to counteract the increase in the mechanical stress. This provides the benefit of enhanced durability due to a relatively longer expected operational lifetime of the fan 14. In turn, this allows the aircraft to travel over a farther distance to a destination airport after ingestion.

In another example, the reduction in mechanical stress contributes to the engine 10 or a similar engine meeting Federal Aviation Regulation 33.76 for bird ingestion.

In one example, the controller 44 commands the actuators 42 to move the nozzle 40 to a position that provides a desired total amount of engine thrust (i.e., from the discharge of the bypass airflow D through the rear exhaust 36 and from the discharge of core flow C). For example, during a bird ingestion test under Federal Aviation Regulation 33.76, during an initial period wherein an engine throttle is constant (e.g., generally constant thrust), the controller 44 adjusts the position of the nozzle 40 to maintain overall engine thrust (i.e., thrust from bypass airflow D) above a threshold thrust. In one example, the threshold thrust is above 75% of a maximum rated thrust of the engine 10.

In another example, the controller 44 commands the actuators 42 to move the nozzle 40 to a position that provides a desirable balance between lowering the mechanical stress on the fan 14 and providing a desired total amount of engine thrust. For example, during a bird ingestion test under Federal Aviation Regulation 33.76, after an initial period of constant thrust, the controller 44 adjusts the position of the nozzle 40 and adjusts engine throttle (e.g., to control thrust) to provide a desirable balance between lowering the mechanical stress on the fan 14 and maintaining a desired amount of total thrust.

Figure 2:
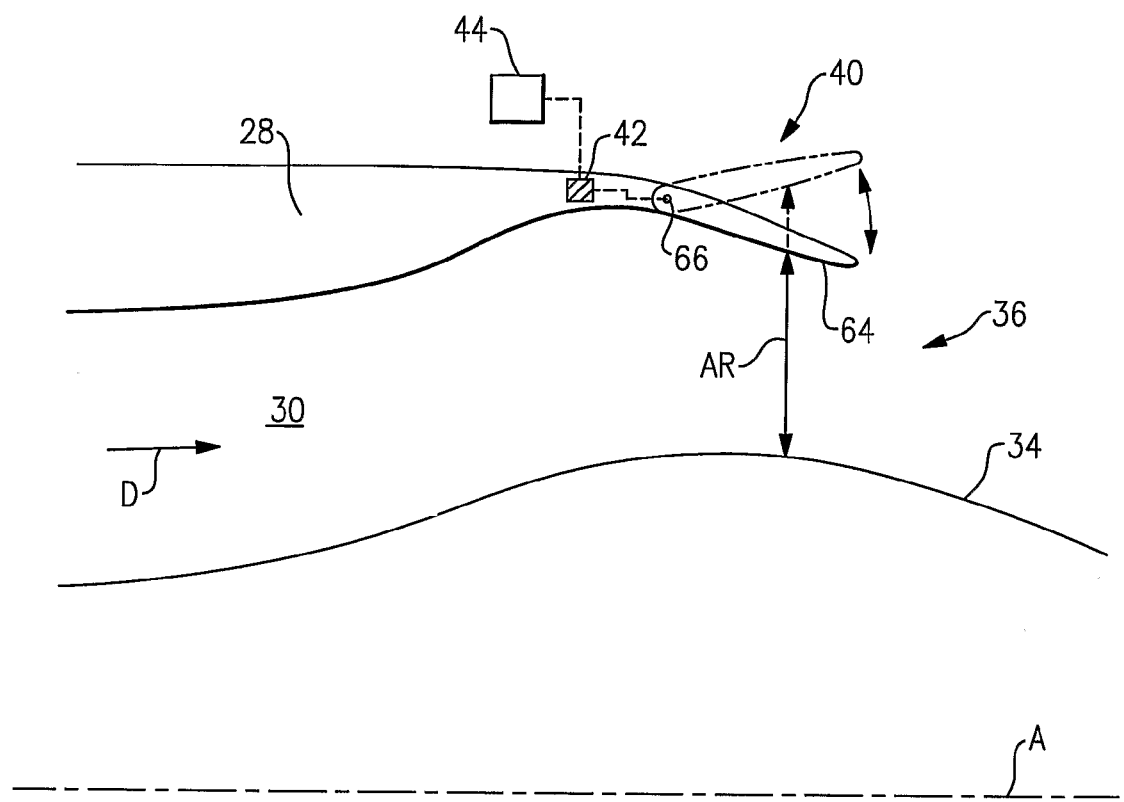
FIG. 2 is a schematic view of an example nozzle for influencing the bypass airflow.

FIG. 2 illustrates an example of the nozzle 40 for influencing the bypass airflow D. In this example, the nozzle 40 includes flaps 64 that are pivotable about hinges 66. Although only a single flap 64 and hinge 66 are shown in this figure, multiple flaps 64 may be used about the circumference of the rear exhaust 36. The flaps 64 are operatively connected with the actuators 42. The controller 44 selectively commands the actuators 42 to pivot the flaps 64 about the respective hinges 66 to vary a cross-sectional area, AR, between the flaps 64 and the inner cowl 34 in this example. In a closed position, the flaps 64 are closer to the inner cowl 34 for a relatively smaller cross-sectional area AR. In an open position, the flaps 64 are farther away from the inner cowl 34 for a relatively larger cross-sectional area AR.

The controller 44 selectively actuates the flaps 64, as described above, to control the air pressure of the bypass airflow D within the bypass passage 30. For example, closing the flaps 64 reduces the cross-sectional area AR, which restricts the bypass airflow D and produces a pressure build-up (i.e., an increase in air pressure) within the bypass passage 30. Opening the flaps 64 increases the cross-sectional area AR, which permits more bypass airflow D and reduces the pressure build-up (i.e., a decrease in air pressure). Likewise, a relatively smaller cross-sectional area AR results in less thrust due to the discharge of the bypass airflow D and a relatively larger cross-sectional area AR results in more thrust from the discharge of the bypass airflow D. Given this description, one of ordinary skill in the art will be able to recognize other types of nozzles for influencing the bypass airflow D.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A gas turbine engine system comprising:
    a fan;
    a fan bypass passage downstream of the fan for conveying a bypass airflow from the fan;
    a nozzle for receiving the bypass airflow from the fan bypass passage, the nozzle having a plurality of different positions that influence the bypass air flow; and
    a controller that commands the nozzle to move to a desired one of the plurality of different positions in response to a foreign object detected near the fan.

2. The gas turbine engine system recited in claim 1, wherein the plurality of different positions corresponds to different cross-sectional areas of the nozzle.

3. The gas turbine engine system recited in claim 1, further comprising a compressor and a turbine generally surrounded by a cowl and a nacelle that extends about the fan, and wherein the fan bypass passage extends between the nacelle and the cowl.

4. The gas turbine engine as recited in claim 1, further including at least one sensor near the fan that produces a signal representative of the foreign object near the fan.

5. The gas turbine engine system recited in claim 4, wherein the at least one sensor is located forward of the fan.

6. The gas turbine engine system recited in claim 4, wherein the at least one sensor is located aft of the fan.

7. The gas turbine engine system recited in claim 4, wherein the fan is rotatable about an axis, and the at least one sensor is axially aligned with fan relative to the axis.

8. The gas turbine engine system recited in claim 4, wherein the at least one sensor comprises laser sensor.

9. The gas turbine engine system recited in claim 4, wherein the at least one sensor comprises at least two sensors.

10. A method of controlling a nozzle used in a gas turbine engine having a fan, a fan bypass passage downstream of the fan for conveying a bypass airflow from the fan, and a nozzle associated with the fan bypass passage, comprising the steps of:
    identifying the presence of a foreign object near the fan and producing a signal in response thereto;
    moving the nozzle to a desired one of a plurality of different positions in response to the signal to influence the bypass airflow.

11. The method recited in claim 10, including moving the nozzle to change an air pressure of the bypass airflow within the fan bypass passage.

12. The method recited in claim 11, including moving the nozzle to decrease the air pressure.

13. The method recited in claim 12, including increasing a cross-sectional area of the nozzle to decrease the air pressure.

14. The method recited in claim 10, including moving the nozzle to change an air pressure ratio between an air pressure forward of the fan and an air pressure aft of the fan.

15. The method recited in claim 10, including moving the nozzle from a first position that corresponds to a first fan operation condition to a second position that corresponds to a second, different fan operation condition.

16. The method recited in claim 15, wherein the first fan operation condition corresponds to a first mechanical stress condition of the fan and the second fan operation condition corresponds to a second mechanical stress condition of the fan that is lower than the first mechanical stress condition.

17. The method recited in claim 10, including moving the nozzle from the desired one of the plurality of different positions to another position to influence thrust of the gas turbine engine.

18. The method recited in claim 10, including moving the nozzle from the desired one of the plurality of different positions to another position to maintain a thrust of the gas turbine engine above a threshold thrust.

19. A method of controlling a nozzle used in a gas turbine engine having a fan, a fan bypass passage downstream of the fan for conveying a bypass airflow from the fan, and a nozzle associated with the fan bypass passage, comprising the steps of:
    detecting a bird ingested into the gas turbine engine; and
    influencing the bypass airflow by moving the nozzle to a desired one of a plurality of different positions in response to detecting the bird to contribute to meeting Federal Aviation Regulation 33.76 for bird ingestion.

20. The method recited in claim 19, including changing a cross-sectional area of the nozzle to control an air pressure of the bypass airflow.

21. The gas turbine engine system as recited in claim 1, including a gear train that is coupled to the fan such that the fan is driven through the gear train.

22. The gas turbine engine system as recited in claim 21, wherein the gear train is a planetary gear system.

23. The gas turbine engine as recited in claim 4, wherein the at least one sensor is operable to identify the presence of the foreign object using electro-optical techniques.

24. The gas turbine engine system as recited in claim 1, including a compressor and a turbine generally surrounded by a cowl and a nacelle that extends about the fan, wherein the fan bypass passage extends between the nacelle and the cowl, and at least one sensor near the fan is located within the nacelle and produces a signal representative of the foreign object near the fan.

* * * * *